(12) United States Patent
Adrian et al.

(10) Patent No.: US 8,727,382 B2
(45) Date of Patent: May 20, 2014

(54) COUPLING DEVICE, CRANKCASE VENTILATION DEVICE AND FRESH AIR SYSTEM

(75) Inventors: Helge Adrian, Stuttgart (DE); Sjard Potscher, Stuttgart (DE)

(73) Assignee: Mahle International GmbH (DE)

( * ) Notice: Subject to any disclaimer, the term of this patent is extended or adjusted under 35 U.S.C. 154(b) by 166 days.

(21) Appl. No.: 13/181,682

(22) Filed: Jul. 13, 2011

(65) Prior Publication Data

US 2012/0012074 A1  Jan. 19, 2012

(30) Foreign Application Priority Data

Jul. 13, 2010 (DE) .......................... 10 2010 031 288

(51) Int. Cl.
*F16L 35/00* (2006.01)

(52) U.S. Cl.
USPC .............................................. 285/4; 285/417

(58) Field of Classification Search
USPC .............. 285/1, 2, 4, 305, 372, 369, 418, 417
See application file for complete search history.

(56) References Cited

U.S. PATENT DOCUMENTS

| | | | | |
|---|---|---|---|---|
| 1,853,411 | A * | 4/1932 | Gentry et al. | 285/369 |
| 2,085,074 | A * | 6/1937 | Boyles | 285/2 |
| 3,487,534 | A * | 1/1970 | Schustack | 285/369 |
| 3,542,405 | A * | 11/1970 | Nalodka | 285/417 |
| 3,759,553 | A * | 9/1973 | Carter | 285/305 |
| 4,067,534 | A * | 1/1978 | Frey | 285/369 |
| 4,098,528 | A * | 7/1978 | Stanley | 285/369 |
| 4,630,630 | A * | 12/1986 | Reynolds et al. | 285/4 |
| 4,717,182 | A * | 1/1988 | Behrens et al. | 285/369 |
| 4,854,338 | A * | 8/1989 | Grantham | 285/4 |
| 6,257,625 | B1 * | 7/2001 | Kitani et al. | 285/2 |
| 6,443,501 | B1 * | 9/2002 | Ketcham et al. | 285/417 |
| 6,893,055 | B2 * | 5/2005 | Thomas et al. | 285/417 |
| 7,090,261 | B2 * | 8/2006 | Pollock et al. | 285/369 |

(Continued)

FOREIGN PATENT DOCUMENTS

| | | |
|---|---|---|
| DE | 3825866 A1 | 2/1990 |
| DE | 102004052475 A1 | 5/2006 |

(Continued)

OTHER PUBLICATIONS

English abstract for DE-3825866.

(Continued)

*Primary Examiner* — David E Bochna
(74) *Attorney, Agent, or Firm* — Rader, Fishman & Grauer PLLC (57) ABSTRACT

A coupling device for connecting a first fluid line to a second fluid line may include a first connecting piece having a first outer latching contour on its outside and may be connected to at least one of the first fluid line and the first outer latching contour. The coupling device may also include a second connecting piece having a second outer latching contour on its outside and being connected to at least one of the second fluid line and the second outer latching contour. A sleeve may also be provided in which both connecting pieces may be inserted on opposite ends thereof. The sleeve may have inner latching contours on its inner side, the inner latching contours being complementary to the outer latching contours and latching with the outer latching contours when the connecting pieces are inserted. The sleeve may be enclosed by a protective cover.

20 Claims, 5 Drawing Sheets

(56) References Cited

U.S. PATENT DOCUMENTS

| | | | |
|---|---|---|---|
| 7,562,910 B2 | 7/2009 | Kertesz et al. | |
| 7,874,596 B2 | 1/2011 | Kertesz et al. | |
| 7,878,556 B2 * | 2/2011 | Gammons | 285/369 |
| 7,938,454 B2 * | 5/2011 | Buchanan et al. | 285/417 |
| 8,157,296 B2 | 4/2012 | Ullrich et al. | |
| 2001/0040377 A1 | 11/2001 | Bandlow et al. | |
| 2007/0216158 A1 | 9/2007 | Kertesz et al. | |

FOREIGN PATENT DOCUMENTS

| | | | |
|---|---|---|---|
| EP | 0924453 | A1 | 6/1999 |
| EP | 1674679 | A2 | 6/2006 |
| EP | 1726865 | A2 | 11/2006 |
| EP | 1835220 | A1 | 9/2007 |
| EP | 1912009 | A1 | 4/2008 |
| EP | 2019079 | A1 | 1/2009 |
| GB | 2141509 | A | 12/1984 |
| WO | WO-2009/124805 | A1 | 10/2009 |

OTHER PUBLICATIONS

English abstract for EP-2019079.

English abstract for EP-1674679.

German Search Report for DE-11172354.0 dated Jul. 18, 2013.

* cited by examiner

COUPLING DEVICE, CRANKCASE VENTILATION DEVICE AND FRESH AIR SYSTEM

CROSS-REFERENCES TO RELATED APPLICATION

This application claims priority to German patent application DE 10 2010 031 288.6 filed on Jul. 13, 2010, which is hereby incorporated by reference in its entirety.

TECHNICAL FIELD

The present invention relates to a coupling device for connecting a first fluid line to a second fluid line, with the features of the preamble of the claim 1. In addition, the invention relates to a crankcase ventilation device for an internal combustion engine equipped with such a coupling device and to a fresh air system for an internal combustion engine equipped with such a coupling device.

BACKGROUND

In case of a fresh air system of an internal combustion engine and a crankcase ventilation device of an internal combustion engine it is necessary within the assembly to connect fluid lines to each other or to components of the respective device or installation. For example, a blow-by gas line of the crankcase ventilation device can be fluidically connected to a crankcase of the internal combustion engine or to an air line of the fresh air system or to an oil separator of the crankcase ventilation device. Furthermore, an air line of the fresh air system can be fluidically connected to the filter of the fresh air system or to the charging device of the fresh air system or to a distributor of the fresh air system. In order to establish such fluidic connections as simple as possible, in particular blind, coupling devices of the aforementioned type can be used.

Such a coupling device is known, for example, from WO 2009/124805 A1. It comprises a first connecting piece which has an outer latching contour on its outside and is connected to a first fluid line or can be connected thereto. Furthermore, a second connecting piece is provided which has an outer latching contour on its outside and is connected to a second fluid line or can be connected thereto. Finally, the coupling device also comprises a sleeve into which both connecting pieces can be inserted on opposite ends and which, on its inner side, has two inner latching contours which are complementary to the outer latching contours of the connecting pieces. When inserting the connecting pieces into the sleeve, the inner latching contours latch with the outer latching contours whereby the respective connecting piece is secured in the sleeve against axial withdrawal.

In case of the known coupling device, the respective inner latching contour is implemented by means of a ring-shaped locking element which is inserted into an inner groove formed on the inner side of the sleeve and has radially resilient latching elements.

Further coupling devices are known from EP 1 912 009 A1, EP 0 924 453 A1 and EP 1 835 220 A1.

SUMMARY

The present invention is concerned with the problem to provide for a coupling device of the aforementioned type or, respectively, for a crankcase ventilation device equipped therewith or, respectively, for a fresh air system equipped therewith, an improved embodiment which is in particular characterized by the increased functional reliability and/or by low manufacturing costs.

According to the invention, this problem is solved by the subject matters of the independent claims. Advantageous embodiments are subject matter of the dependent claims.

The invention is based on the general idea to enclose the sleeve with a protective cover. The use of such a protective cover offers protection against contamination and damage and thus increases the functional reliability of the coupling device. For example, in a vehicle application, a component equipped with such a coupling device can move relative to other components so that in particular contacts can take place which, on a continuing basis, can result in damages. By providing the sleeve with such a protective cover, the risk of such damages to the sleeve can be reduced.

Particularly advantageous is an embodiment in which the latching between the connecting piece and the sleeve is configured in such a manner that it can not be released without destroying the sleeve and/or at least one of the connecting pieces. In this respect, this involves a coupling device for establishing a non-releasable connection. With this construction, on the one hand, the risk of manipulations can be reduced. On the other, it is also possible to reduce the risk that the latching becomes self-actingly released.

In order to configure the latching in this respect in a non-releasable manner it can be provided, for example, to arrange the interacting latching contours in the axial direction of the sleeve comparatively far inside so as to make access from the outside by means of a tool more difficult. Furthermore, it is also possible to adapt the materials of sleeve and connecting piece to each other in such a manner that an elastic deformation resulting in the latching becoming released is not possible.

According to another advantageous embodiment, the sleeve can have at least one predetermined breaking point which allows a systematic destruction of the sleeve. By means of said predetermined breaking point, a possibility is provided to release the latched connection in such a manner that only the sleeve is destroyed so that in particular damage to the connecting pieces can be prevented. Since the connecting pieces are usually fixedly attached to or arranged on another component, namely the respective fluid line, it is much easier to replace the sleeve than a connecting piece.

For implementing the predetermined breaking point, at least one axial groove can be formed on the outside of the sleeve. In this axial groove, for example a suitable tool, in particular a slotted screwdriver can be placed so as to destroy the sleeve there.

Attaching the protective cover is of particular advantage in particular in connection with a predetermined breaking point accessible from outside. The protective cover can in particular be configured in such a manner that it hides or masks the predetermined breaking point so that access to the predetermined breaking point is made difficult or prevented. Moreover, the protective cover can be opaque, thus non-translucent, so that a predetermined breaking point which is possibly visible on the outside of the sleeve is no longer visible.

Particularly advantageous is therefore an embodiment in which the protective cover covers the actuation point of a predetermined breaking point arranged on the outside of the sleeve, wherein the predetermined breaking point, when actuated, allows a systematic destruction of the sleeve for releasing the latching between the connecting piece and the sleeve. Hereby, the actuation point or the predetermined breaking point remains invisible which makes misuse for releasing the latching more difficult.

In case of a predetermined breaking point which is formed by an outer longitudinal groove, the longitudinal groove itself serves as actuation point, namely as engagement possibility for a suitable tool such as, e.g., a slotted screwdriver. Alternatively, the actuation point can also be formed, for example, as slot-shaped recess or through-opening in which an adequate tool such as, e.g., a slotted screwdriver can engage and which is arranged, for example, in the region of an inner longitudinal groove on the sleeve. Also, the sleeve can consist for example of two half shells which are connected, in particular adhered to each other in a parting plane. The recess or the through-opening or any other suitable actuation point or engagement point can then specifically be arranged in the region of said connection or adhesion.

In one further embodiment, the protective cover can be configured as coating which is applied onto the sleeve. Alternatively, the protective cover can be an additional component applied onto the protective sleeve. For example, said protective cover component can be slid, shrink-fitted, wound onto the sleeve or applied onto it in a different manner. Furthermore, said protective cover component can be loosely arranged on the sleeve or fixedly connected to the sleeve, for example by means of adhesion, vulcanization or plasticizing.

According to another embodiment it can be provided to integrally form the inner latching contours on the sleeve. Hereby, a separate locking element for implementing the inner latching contours is no longer required. Thus, producing additional components and mounting said additional components is eliminated. Overall, said coupling device can thus be implemented in a comparatively inexpensive manner.

Advantageously, the outer latching contours are also integrally formed on the connecting pieces. Thus, for a secure latching of the coupling device, only three components are required, namely the two connecting pieces and the sleeve. It is clear that in addition also at least one sealing element can be present so as to sealingly connect the two fluid lines to each other by means of the coupling device.

According to a particularly advantageous embodiment, the respective inner latching contour can be formed by at least two latching contour segments arranged distributed in the circumferential direction. In other words, the respective inner latching contour is not implemented in the circumferential direction such that it extends over the entire circumference, but in segments. Hereby, the latching during the plug-in process is simplified.

Particularly advantageous is an advanced embodiment in which the latching contour segments of the one inner latching contour are arranged offset in the circumferential direction with respect to the latching contour segments of the other inner latching contour. This can result in particular in manufacturing-related advantages. For example, an injection molding tool for manufacturing the sleeves is simpler to implement here because less undercut contours are present.

According to another advanced configuration, the respective inner latching contour can have exactly two latching contour segments which are arranged offset to each other in the circumferential direction by 90° with respect to the two latching contour segments of the respective other inner latching contour. This too results in a simplification for the implementation of a suitable injection molding tool.

According to a further embodiment, at least one of the connecting pieces can comprise an annularly and circumferentially extending collar projecting on its outer side which serves as axial stop or radial support for the sleeve. By said collar, on the one hand, positioning and stabilizing the sleeve relative the respective connecting piece is implemented. On the other, said collar makes accessibility to the latching contours more difficult.

According to another advantageous embodiment, at least one of the connecting pieces can have at least one recess, in particular an axial slot with substantially parallel sides. Other recesses can be, e.g., V-shaped. Such a recess results in a weakening of the material with respect to radial forces. Consequently, the respective connecting piece can be easier radially elastically deformed in the region of the recess whereby in particular the insertion process or the latching between the latching contours is simplified. Advantageously, the respective axial slot or the recess is positioned in such a manner that it begins at the axial front side of the respective connecting piece and then extends in the axial direction. Moreover, between wall sections which delimit the respective axial section in the circumferential direction, there is a gap whereby the radial elastic resilience of the connecting piece's circumferential segments separated from each other by means of the recesses or axial slots is improved. Preferably, for each connecting piece, at least two, preferably four such recesses or axial slots are provided which are preferably arranged uniformly distributed in the circumferential direction.

According to a special embodiment, each connecting piece can have a radial seal on its outer side, wherein in the inserted state, said radial seal rests sealingly against the inner side of the sleeve. In this case, each connecting piece is separately sealed with respect to the sleeve. In such an embodiment it is possible in the inserted state that the two connecting pieces abut within the sleeve against each other's front side. Hereby, the coupling device is particularly compact and dimensionally stable. In addition, this embodiment has a very low through-flow resistance because both connecting pieces can be provided with equal inner cross-sections whereby a through-flow and coupling device without cross-sectional steps is possible.

Also, as an alternative, an embodiment is possible in which in the inserted state of the connecting pieces, the one connecting piece is inserted within the sleeve into the other connecting piece. Hereby, the sealing of the fluid lines to be connected is simplified because only the two connecting pieces have to be sealed relative to each other. In this case, a seal between connecting piece and sleeve is no longer required. For example, the connecting piece inserted into the other connecting piece can have a radial seal arranged on its outer side, which seal, in the inserted state, rests sealingly against the inner side of the other connecting piece.

The respective outer latching contour can extend on the respective connecting piece in the circumferential direction over the entire circumference. Hereby, a secure latching with the sleeve is simplified. If slotted connecting pieces are provided, the axial slots can advantageously be dimensioned in the axial direction in such a manner that they interrupt the respective outer latching contour in the circumferential direction. Hereby is achieved that the circumferential segments, formed by means of the axial slots, of the respective connecting piece carry the outer latching contour or the outer latching contour segments so that the outer latching contour segments can resiliently deflect inwardly during the insertion process.

According to an advantageous configuration of the invention, the outer latching contours have a cross-section which continuously increases counter to the mounting direction. Said continuous increase can be implemented linearly, thus with a constant incline, or with different inclines. Preferably, the increase encloses an acute angle, in particular an angle smaller than 75°, preferably 30°-45°. In case of different inclines it is advantageous to start with a small incline and to increase it subsequently. This ensures a good mountability. The continuous cross-sectional increase is followed by a sudden cross-sectional decrease which forms a wall which extends radially, thus at an angle of 90° with respect to the mounting direction. In other embodiments, this wall can also enclose a greater angle, in particular up to 100°, or a smaller angle, in particular greater than 45°. In an advantageous embodiment, said cross-sectional decrease can correspond to the outer circumference of the connecting piece. However, in another embodiment, said cross-sectional decrease can also be greater or smaller than the outer circumference. In this case, a shoulder or a groove is provided. The inner latching contour of the sleeve corresponding to said outer latching contour of the connecting piece can be configured, e.g., as integral annular wall having parallel sides or as inner groove.

In a further advantageous configuration of the invention, the inner latching contours of the sleeve are provided with a cross-section which decreases in the mounting direction. This tapering cross-section can be implemented linearly, with constant incline or with different inclines. Adjacent to the incline is a cross-sectional step which is configured as radially extending wall. This inner latching contour can be configured analog to the above embodiments with respect to the outer latching contour and can correspond to an outer latching contour which, e.g., is configured as circumferential shoulder or as a retaining ring arranged in a groove.

According to a particularly advantageous embodiment, the increasing cross-sections of the outer latching contours of the connecting pieces correspond to the tapering inner latching contours of the sleeve. In other words, the conical latching contours have the same amounts of conicity, thus cone angles. Thus, the chamfers of both latching contours slide with their surfaces on each other. After passing the cross-sectional steps, the same abut against each other with their radially extending regions and thus form a non-releasable latching.

Further important features and advantages of the invention arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

DETAILED DESCRIPTION

According to the FIGS. 1 to 6, a coupling device 1 comprises a first connecting piece 2, a second connecting piece 3 and a sleeve 4. The coupling device 1 serves for connecting a first fluid line 5 indicated with a broken line to a second fluid line 6 likewise indicated with a broken line. The fluid lines 5, 6 can be integral parts of a non-illustrated crankcase ventilation device of an internal combustion engine or of a fresh air system of an internal combustion engine. For example, one of the two fluid lines 5, 6 can be a blow-by gas line of the crankcase ventilation device which connects a crankcase of the internal combustion engine to a fresh air system of the internal combustion engine. The other fluid line 5, 6 can then be formed at the crankcase or the fresh air system or at an oil separator of the crankcase ventilation device. In a fresh air system, the one fluid line can be formed by an air line while the other fluid line 5, 6 can be formed at a filter of the fresh air system or at a charging device, in particular compressor of the fresh air device or at a distributor of the fresh air system.

The first connecting piece 2 has an outer latching contour 7 on its outer side and is connected to the first fluid line 5 or is configured such that it can be connected to the first fluid line 5. If the first fluid line 5 is a housing, the first connecting piece 2 can be integrally formed on this housing. If the first fluid line 5 is a hose, the same can be coiled on the first connecting piece 2.

The second connecting piece 3 has also an outer latching contour 8 on its outside and is connected to the second fluid line 6 or is configured such that it can be connected to the second fluid line 6. If the second fluid line 6 is a housing or the like, the second connecting piece 3 can be integrally formed on said housing. However, if the second fluid line 6 is a hose, the same can be coiled on the second connecting piece 3. In the embodiments of the FIGS. 1 to 5, the two connecting pieces 2, 3 are identically formed so that identical parts are involved here. Counter to the mounting direction, the outer latching contours 7, 8 show a continuous cross-sectional increase, thus a cone. The same is configured such that is has the profile of a ramp. In the mounting direction, the outer latching contours 7, 8 have a sudden cross-sectional change which is configured as step.

The sleeve 4 is dimensioned such that the two connecting pieces 2, 3 can be axially inserted therein with respect to a longitudinal center axis 9 of the cylindrical sleeve 4, namely on opposite ends of the sleeve 4. The longitudinal center axis 9 of the sleeve 4 defines at the same time the insertion direction and the longitudinal axis of the coupling device 1. On its inner side, the sleeve 4 has two latching contours 10 and 11 which are formed complementary to the outer latching contours 7, 8 of the connecting pieces 2, 3. The latching contours 7, 8, 10, 11 are adapted to each other in such a manner that they latch with each other during insertion of the connecting piece 2, 3 into the sleeve 4 and secure the connection established in this manner between the fluid lines 5, 6. The sleeve 4 or the respective inner latching contour 10, 11 shows also a continuous cross-sectional change, thus e.g. a cone or a ramp profile counter to the mounting direction and adjacent thereto, a sudden cross-sectional change back to the initial diameter which has a ramp-type profile. When mounting, the chamfers or ramps of the latching contours 7, 8, 10, 11 slide with their surfaces on each other, in particular in case of identical conicities, until they have passed the cross-sectional step. Then, the substantially radially extending walls located at the end of the respective step rest axially against each other thereby forming a preferably non-releasable latching connection.

The inner latching contours 10, 11 are integrally formed on the sleeve 4. Advantageously, the outer latching contours 7, can also be integrally formed on the respective connecting piece 2, 3.

Figure 3:
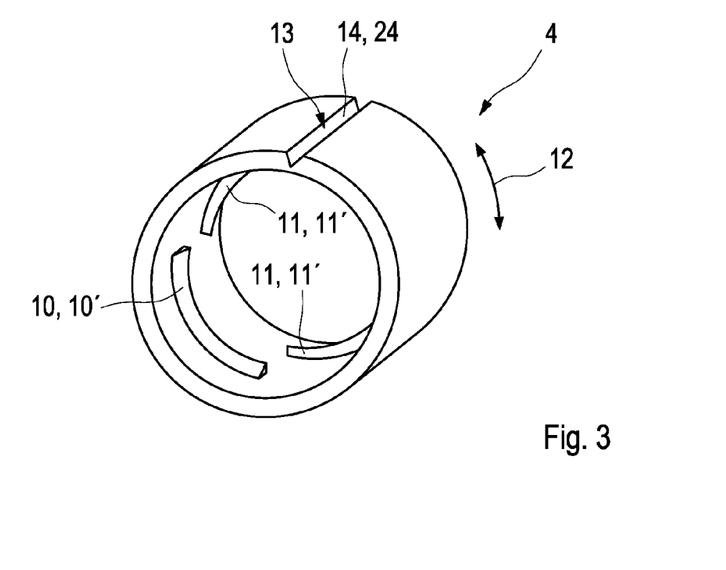
FIG. 3 shows an isometric view of a sleeve of the coupling device.
Figure 8:
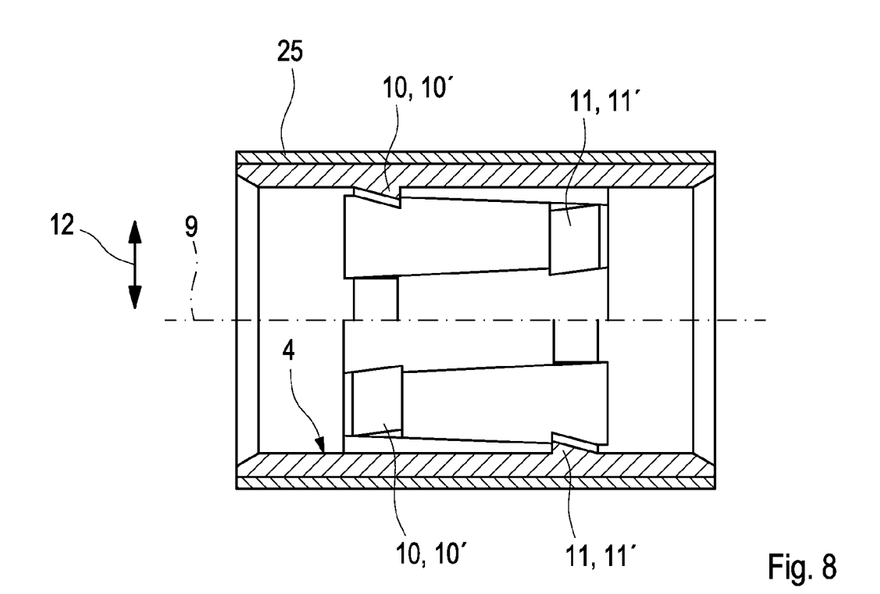
FIG. 8 shows a longitudinal section of the sleeve with a protective cover.

As illustrated for example in the FIGS. 3 and 8, the inner latching contours 10, 11 can be configured in such a manner that they do not extend over the entire circumference in a circumferential direction 12 of the sleeve 4 indicated by a double arrow in the FIGS. 3 and 8, but are formed by at least two latching contour segments 10' and 11' arranged distributed in the circumferential direction 12. In the examples shown here, the respective inner contour 10, 11 has exactly two (FIG. 3) and exactly four (FIG. 8) such latching contour elements 10' and 11', respectively. Here, within the respective latching contour 10, 11, the associated latching contour segments 10', 11' are positioned diametrically opposite each other. Furthermore, the latching contour segments 10' of the one latching contour 10 are offset in the circumferential direction 12 with respect to the latching contour segments 11' of the other inner latching contour 11. This offset in the circumferential direction is approximately 90° in the embodiment shown in FIG. 3 and approximately 45° in the embodiment shown in FIG. 8.

Preferably, the coupling device 1 is designed in such a manner that the connection established therewith in particular between the connecting pieces 2, 3 and the sleeve 4 is configured in a non-releasable manner, thus can only be released by destroying the sleeve 4 and/or at least one connecting piece 2, 3. Thus, in particular, no releasing means are provided. Furthermore, it is also not provided that the sleeve 4 and/or the connecting pieces 2, can be elastically deformed to an extent that the latching could be released by elastic deformation.

If, however, the connection established by means of the coupling device 1 has to be disconnected, the sleeve 4 according to the FIGS. 3, 5, 6 and 9 can be equipped with at least one predetermined breaking point 13. Said predetermined breaking point 13 is designed such that it allows a systematic destruction of the sleeve 4 for releasing the connection or latching. By systematically destroying the sleeve 4 it is in particular possible to prevent damage to the connecting pieces 2, 3 and, as the case may be, the fluid lines 5, 6 connected thereto. By replacing the destroyed sleeve 4, the coupling device 1 can be reconditioned if needed so that the latter allows again a connection between the fluid lines 5, 6 or, respectively, a latching of the two connecting pieces 2, 3 by inserting into the new sleeve 4.

Advantageously, said predetermined breaking point 13 can be implemented by an axial groove 14 which is formed on the outside of the sleeve 4. Advantageously, the axial groove 14 extends over the entire axial length of the sleeve 4. In the example of FIG. 3, the axial groove 14 has a wedge-shaped or V-shaped profile which allows a particularly simple separation.

For actuating the respective predetermined breaking point 13, the sleeve 4 has advantageously an actuating point 24 on its outside which allows an actuation of the predetermined breaking point 13 resulting in the desired destruction of the sleeve 4. For example, the actuation point 24 allows the engagement of a tool for destroying the sleeve 4. Accordingly, the actuation point 24 can also be dedicated as engagement point. In case of an external axial groove 14, advantageously, said axial groove 14 itself forms the actuation point 24. In other words, the axial groove 14 forms the predetermined breaking point 13 and, at the same time, the actuation point 24. Alternatively, it is principally also possible to implement the predetermined breaking point 13 by means of an internal axial groove or with an invisible material weakening or adhesive bond or the like. However, in this case, the actuation point 24 advantageously remains arranged on the outside of the sleeve 4, for example in the form of an elongated hole-shaped depression or through-opening.

Figure 1:
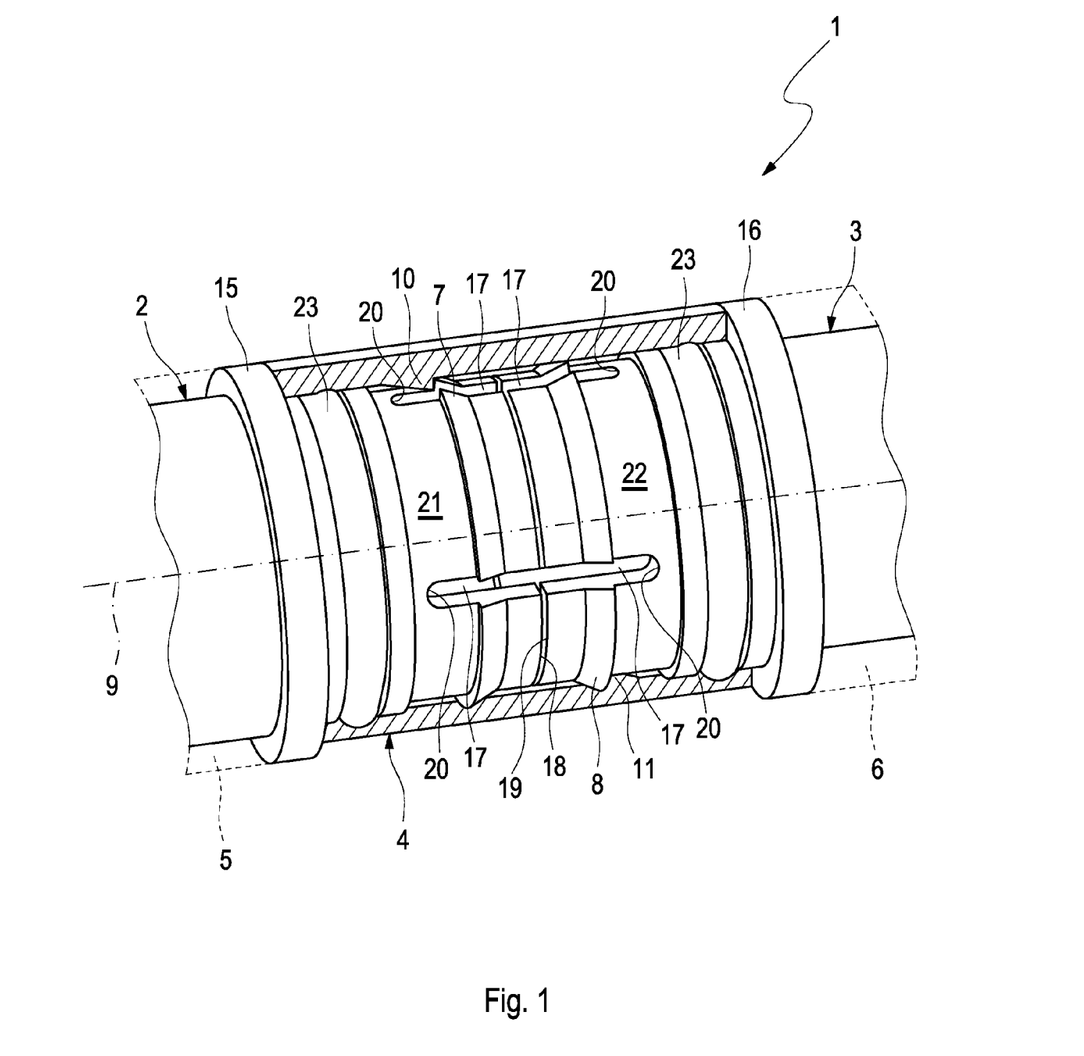
FIG. 1 shows a partial sectional isometric view of a coupling device.
Figure 2:
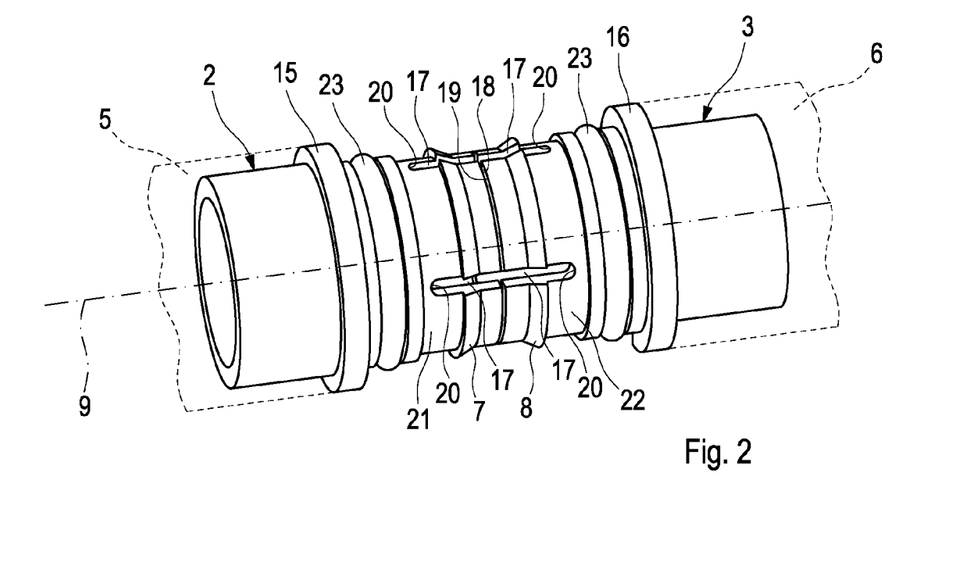
FIG. 2 shows an isometric view of two connecting pieces of the coupling device.

In the embodiments shown in the FIGS. 1 and 2 as well as 4 and 5, the two connecting pieces 2, 3 are each equipped with a collar 15, 16 which projects outwardly and is configured to extend annularly in the circumferential direction. In the embodiment in the FIGS. 1 and 2, the two collars 15, 16 are adjusted to the sleeve 4 in such a manner that in the latched state, they form an axial stop for the sleeve 4. In contrast to that, the two collars 15, 16 in the embodiments of FIGS. 4 and 5 are adjusted to the sleeve 4 such that in the latched state, they form a radial support for the sleeve 4.

Figure 4:
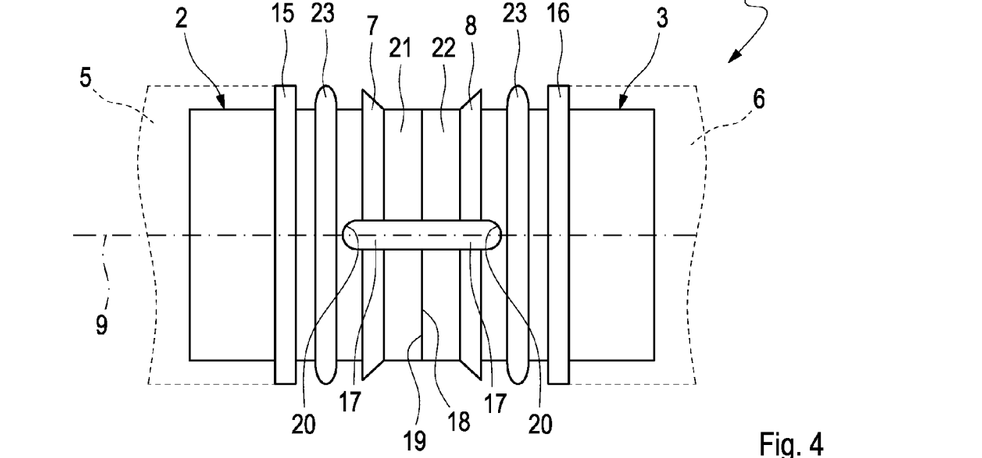
FIG. 4 shows a side view of the two connecting pieces but in a different embodiment of the coupling device.
Figure 5:
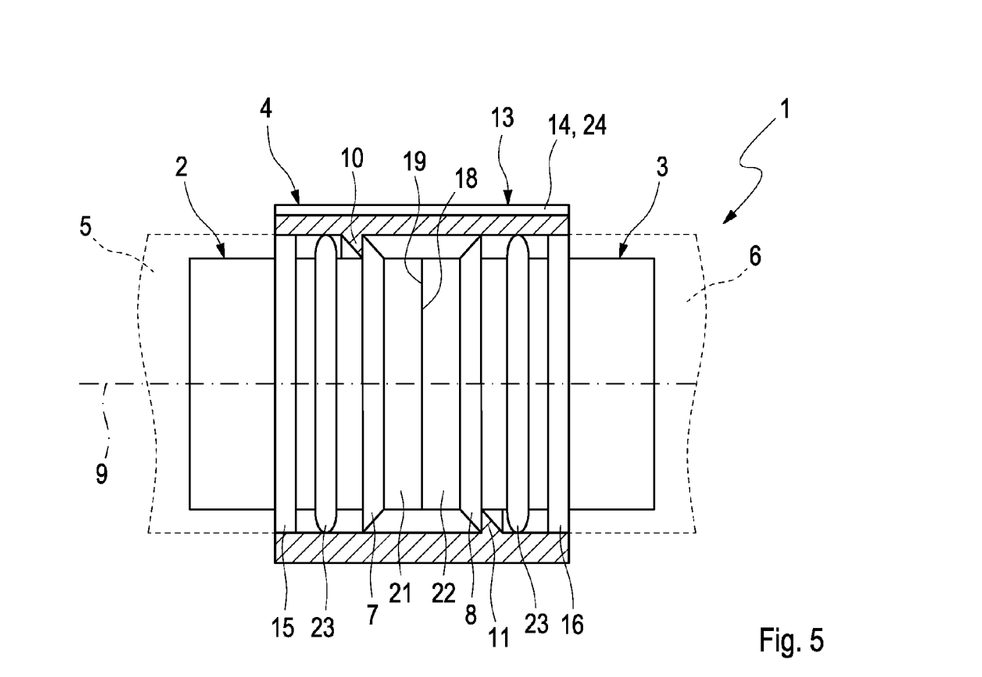
FIG. 5 shows a partial sectional side view of the coupling device in a further embodiment.

In the embodiments of the FIGS. 1, 2 and 4, the two connecting pieces 2, 3 are axially slotted so that each connecting piece 2, 3 has at least one axial slot 17. Preferably, a plurality of axial slots 17 is provided for each connecting piece 2, 3. Advantageously, the respective slot 17 begins in each case on a front side end 18 or, respectively, 19 of the respective connecting piece 2, 3. Said slot extends axially, thus parallel to the longitudinal center axis 9 of the sleeve 4. It ends preferably in a rounded slot base 20 so as to reduce stress peaks.

Instead of axial slots 17, any other recesses are principally also implementable so as to improve the radial resilient elasticity of the circumferential sections of the respective connecting piece 2, 3. Such recesses can have parallel sides or can be V-shaped.

If a plurality of axial slots 17 for each connecting piece 2, 3 is present, said slots are preferably uniformly distributed in the circumferential direction 12. For example, four axial slots 17 can be provided for each connecting piece 2, 3 which slots are each arranged offset to each other by approximately 90°. In an end section which comprises the respective outer latching contour 7 or 8, the axial slots 17 subdivide the respective connecting piece 2 into a plurality of connecting piece segments 21, 22 which have a certain resilient elasticity in the radial direction. Hereby, the latching process can be significantly simplified. Advantageously, the axial slots 17 extend in this case through the respective outer latching contour 7, 8, whereby the latter is interrupted in the circumferential direction 12 by the respective slot 17.

In the embodiments of the FIGS. 1 to 5, each connecting piece 2, 3 has at least one radial seal 23 on its outside, which seal, in the inserted or latched state, is sealingly resting against the inner side of the sleeve 4. In order to achieve a design as compact as possible so as to prevent relative movements in the latched state between the connecting pieces 2, 3 and the sleeve 4, the connecting pieces 2, 3 and the sleeve or the latching contour 7, 8, 10, 11 can be adjusted to each other in such a manner that the two connecting pieces 2, 3 abut on the front sides against each other once they are latched with the sleeve 4.

Figure 6:
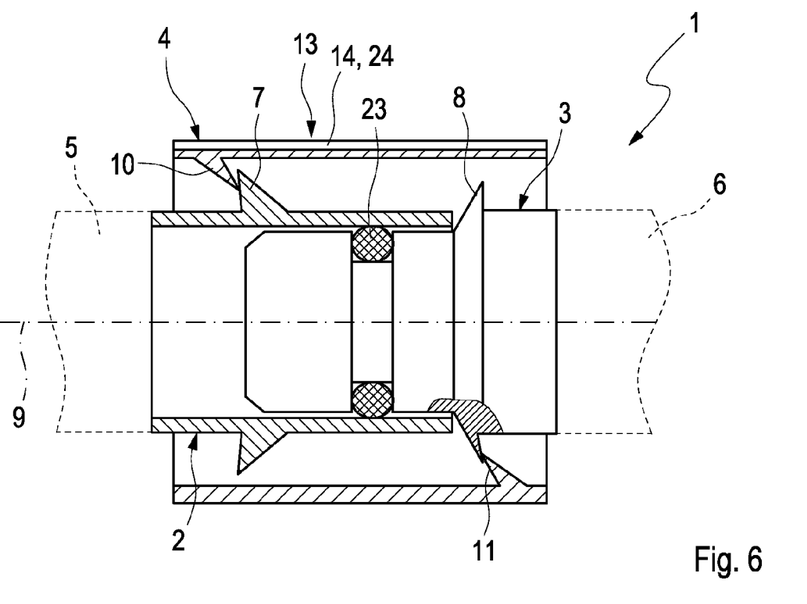
FIG. 6 shows a partial sectional side view of the coupling device in another embodiment.

FIG. 6 shows another embodiment in which in the latched state, the one connecting piece, here the second connecting piece 3, is inserted within the sleeve 4 into the other connecting piece, thus in the first connecting piece 2. It is noteworthy that also in this embodiment, both connecting pieces 2, 3 are each directly latched with the sleeve 4. This embodiment is characterized in that only one radial seal 23 is required to be able to implement the desired sealing within the coupling device 1. For this purpose, said radial seal 23 is arranged on the outside of the connecting piece 3 inserted into the other connecting piece 2 and, in the inserted state, rests sealingly against an inner side of the other connecting piece 2. An additional seal between the connecting pieces 2, 3 and the sleeve 4 is not required here.

Figure 7:
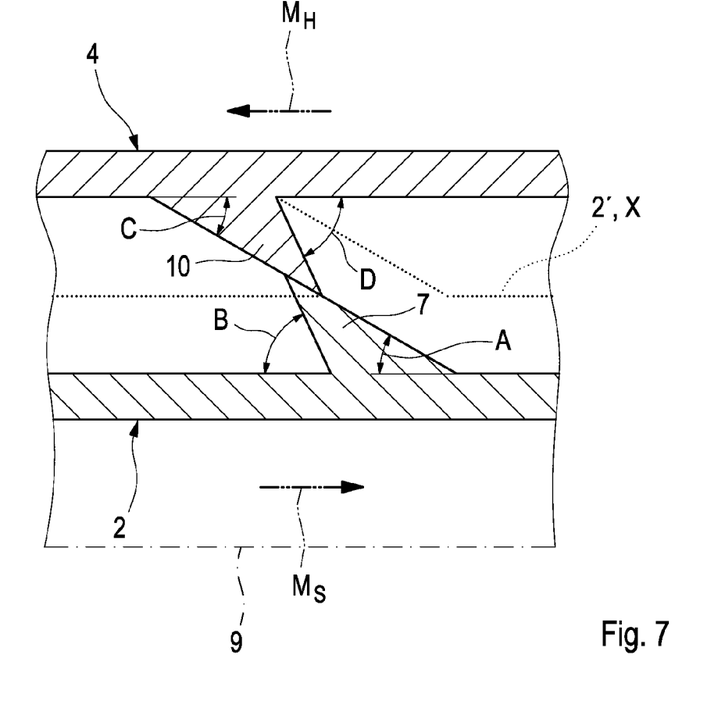
FIG. 7 shows a longitudinal section of the coupling device in the region of latching contours.

In FIG. 7, a detail of the latching contours 7, 8, 10, 11 is illustrated. The first connecting piece 2 is inserted in the mounting direction $M_S$ (dot-dashed arrow) into the sleeve 4. In addition, the sleeve 4 can also be slid in the mounting direction $M_H$ (dot-dashed arrow) onto the connecting piece 2. The outer latching contour 7 of the first connecting piece 2 shows a cross-sectional increase which increases linearly counter to the mounting direction $M_S$ at an acute angle A. The angle A lies between 20° and 75°, preferably approximately 30° to 45°. Downstream of the cross-sectional increase, the cross-section tapers in a step-like manner, wherein between the outer diameter of the connecting piece and the cross-sectional increase, an angle B is formed. Said angle B lies between 45° and 100°, preferably between 75° and 90°. The inner latching contour 10 of the sleeve 4 shows also a linearly extending cross-sectional increase. The latter is defined by the angles C and D. Angle C is formed analog to angle A and angle D is formed analog to angle B. Angles A and C are preferably identical whereas angles B and D can be different or are also identical. The dotted line X shows the first connecting piece 2' in the mounted position, thus after latching.

Figure 9:
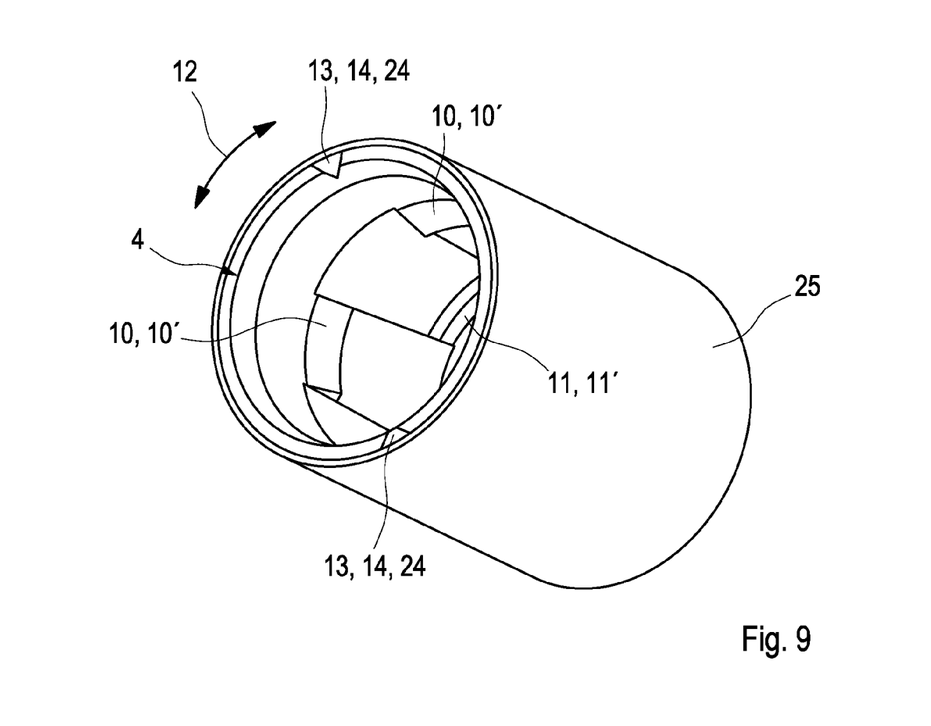
FIG. 9 shows a perspective view of the sleeve with protective cover.

According to the FIGS. 8 and 9, the coupling device 1 according to the invention is additionally provided with a protective cover 25 which encloses the sleeve 4. The protective cover 25 encloses the sleeve 4 preferably completely in the circumferential direction 12. On the one hand, the protective cover 25 protects the sleeve 4 against damage. On the other, the protective cover 25 can be configured in particular in such a manner that it covers the actuation point 24 optionally provided on the outside of the sleeve 4. For example, for this purpose, the protective cover 25 is opaque so that the actuation point 24 is not visible through the protective cover 25.

If, as in the shown examples, the actuation point 24 coincides with the predetermined breaking point 13, in particular with the axial groove 14, the protective cover covers the predetermined breaking point 13 or, respectively, the axial groove 14.

The protective cover 25 can be implemented, for example, as additional component which is present in addition to the sleeve 4 and is mounted to the sleeve 4 in a suitable manner. For example, the protective cover 25 can be shrink-fitted or simply attached or wound onto the sleeve 4. Optionally, the protective cover 25 can be fastened on the sleeve 4, for example by adhesive bonding, vulcanizing or plasticizing. The protective cover 25 can involve, for example, a plastic foil, a metal foil, a pipe with a small wall thickness or a hose or a wrapping tape or the like.

Alternatively, the protective cover 25 can also be placed on the sleeve 4 in the form of a coating. Such a coating, for example, can be sprayed, spread, injection molded or foamed onto the sleeve.

In order to be able to release the latching established by means of the coupling device 1 between the connecting piece 2, 3 and the sleeve 4 by destroying the sleeve 4, the protective cover 25 can be at least partially removed from the sleeve 4. If the protective cover 25 is formed by a coating, the protective cover 25, e.g., can be scraped off the sleeve 4 at least in certain regions, namely in the region of the respective predetermined breaking point 13 or in the region of the respective actuation point 24. However, if the protective cover 25 is a separate component, the protective cover 25 can be cut open or pulled off. Alternatively, in case of the coating solution as well as the component solution for the protective cover 25 it is possible to compress the protective cover 25 at least in the region of the actuation point 24 or in the region of the predetermined breaking point 13 so as to actuate the predetermined breaking point 13. In this case, the selected material of the protective cover 25 is adequately resilient.

As an additional function, the protective cover 25 can also be provided with a special color, for example by selecting signal colors such as e.g. red, yellow, orange.

For covering the actuation point 24 or the predetermined breaking point 13, the protective cover 25 advantageously extends in the axial direction over the entire length of the sleeve 4. In particular for the case that both connecting pieces 2, 3 are inserted in the sleeve 4, it is then no longer visible from outside that the sleeve 4 and the protective cover 25 are two separate components and, in particular, that the protective cover 25 covers an actuation point 24 or predetermined breaking point 13 provided on the sleeve 4.

The invention claimed is:

1. A coupling device for connecting a first fluid line to a second fluid line, comprising:
   a first connecting piece having a first outer latching contour on its outside, the first connecting piece being connected to at least one of the first fluid line and the first outer latching contour,
   a second connecting piece having a second outer latching contour on its outside, the second connecting piece being connected to at least one of the second fluid line and the second outer latching contour, and
   a sleeve in which both connecting pieces can be inserted on opposite ends thereof, the sleeve having inner latching contours on its inner side, the inner latching contours being complementary to the outer latching contours and latching with the outer latching contours when the connecting pieces are inserted,
      wherein the sleeve has at least one predetermined breaking point configured to allow a systematic destruction of the sleeve,
      wherein the sleeve is covered by a protective cover and the protective cover is at least one of a coating applied onto the sleeve and an additional component-disposed on the sleeve.

2. The coupling device according to claim 1,
   wherein the latching between the connecting pieces and the sleeve is configured to not be releasable without destroying at least one of the sleeve, the first connecting piece, and the second connecting piece.

3. The coupling device according to claim 1, the systematic destruction of the sleeve including releasing of the latching between the connecting pieces and the sleeve, wherein the predetermined breaking point is formed by at least one axial groove.

4. The coupling device according to claim 1,
   wherein the protective cover covers an actuation point of the predetermined breaking point, wherein the actuation point is arranged on an outside of the sleeve and when actuated, the predetermined breaking point is configured to allow a releasing of the latching between the connecting pieces and the sleeve.

5. The coupling device according to claim 1,
   wherein the outer latching contours have a ramp-shaped profile and the ramp-shaped profiles of the latching contours are configured to slide along the ramp-shaped profiles of each corresponding contour.

6. A coupling device for connecting a first fluid line to a second fluid line, comprising:
- a first connecting piece having a first outer latching contour on its outside, the first connecting piece being connected to at least one of the first fluid line and the first outer latching contour,
- a second connecting piece having a second outer latching contour on its outside, the second connecting piece being connected to at least one of the second fluid line and the second outer latching contour, and
- a sleeve in which both connecting pieces can be inserted on opposite ends thereof, the sleeve having inner latching contours on its inner side, the inner latching contours being complementary to the outer latching contours and latching with the outer latching contours when the connecting pieces are inserted,
  - wherein the sleeve has at least one predetermined breaking point configured to allow a systematic destruction of the sleeve,
  - wherein the inner latching contours are integrally formed on the sleeve, and the outer latching contours are integrally formed on the connecting pieces.

7. The coupling device according to claim 6, the systematic destruction of the sleeve including releasing of the latching between the connecting pieces and the sleeve, wherein the predetermined breaking point has at least one axial groove on an outside of the sleeve.

8. The coupling device according to claim 6, wherein the sleeve is covered by a protective cover and the protective cover covers an actuation point of the predetermined breaking point, wherein the actuation point is arranged on an outside of the sleeve and when actuated, the predetermined breaking point is configured to allow a releasing of the latching between the connecting pieces and the sleeve.

9. The coupling device according to claim 6, wherein the latching between the connecting pieces and the sleeve is configured to not be releasable without destroying at least one of the sleeve, the first connecting piece, and the second connecting piece.

10. The coupling device according to claim 6, wherein the outer latching contours have a ramp-shaped profile and the ramp-shaped profiles of the latching contours are configured to slide along the ramp-shaped profiles of each corresponding contour.

11. A fresh air system for an internal combustion engine comprising:
- an air line,
- at least one coupling device for connecting the air line to at least one of a filter of the fresh air system, a charging device of the fresh air system, and a distributor of the fresh air system;
- a first connecting piece having a first outer latching contour on its outside, the first connecting piece being connected to at least one of the first fluid line and the first outer latching contour,
- a second connecting piece having a second outer latching contour on its outside, the second connecting piece being connected to at least one of the second fluid line and the second outer latching contour,
- a sleeve in which both connecting pieces can be inserted on opposite ends thereof, the sleeve having inner latching contours on its inner side, the inner latching contours being complementary to the outer latching contours and latching with the outer latching contours when the connecting pieces are inserted, and
- wherein the sleeve has at least one predetermined breaking point configured to allow a systematic destruction of the sleeve including releasing the latching between the connecting pieces and the sleeve, wherein the predetermined breaking point has at least one axial groove on an outside of the sleeve.

12. The coupling device according to claim 11,
- wherein the inner latching contours are each formed by at least two latching contour segments distributed in the circumferential direction,
- wherein the latching contour segments of the one inner latching contour are disposed offset in the circumferential direction with respect to the latching contour segments of the other inner latching contour, and
- wherein the respective inner latching contour has the two latching contour segments disposed offset in the circumferential direction by approximately 90° with respect to the two latching contour segments of the respective other inner latching contour.

13. The coupling device according claim 11,
- wherein at least one of the connecting pieces has an annularly and circumferentially extending collar projecting on its outside and serving as at least one of an axial stop and a radial support for the sleeve, and
- wherein at least one of the connecting pieces has at least one recess,
- wherein the at least one recess is a plurality of recesses distributed in the circumferential direction and the outer latching contours extend circumferentially on the respective connecting piece in the circumferential direction and are interrupted by at least one of the respective recess or by a respective axial slot.

14. The coupling device according to claim 13, wherein the at least one recess is an axial slot.

15. The coupling device according claim 11,
- wherein, in the inserted state, each connecting piece has a radial seal which is arranged on its outside and rests sealingly against the inner side of the sleeve, and the two connecting pieces abut with their front sides against each other within the sleeve.

16. The coupling device according claim 11,
- wherein the second connecting piece is configured to be inserted within the sleeve into the first connecting piece, and
- the second connecting piece has on its outside a radial seal on its outside which rests sealingly against the inner side of the other connecting piece.

17. The coupling device according to claim 11,
- wherein the outer latching contours have a ramp-shaped profile and the ramp-shaped profiles of the latching contours are configured to slide along the ramp-shaped profiles of each corresponding contour.

18. The fresh air system according to claim 11, wherein the latching between the connecting pieces and the sleeve is configured to not be releasable without destroying at least one of the sleeve, the first connecting piece, and the second connecting piece.

19. The fresh air system according to claim 11, wherein the sleeve is covered by a protective cover and the protective cover covers an actuation point of a predetermined breaking point, wherein the actuation point is arranged on an outside of the sleeve and when actuated, the predetermined breaking point is configured to allow a systematic destruction of the sleeve including releasing the latching between the connecting pieces and the sleeve.

20. The fresh air system according to claim 11, wherein the sleeve is covered by a protective cover and the protective cover is at least one of a coating applied onto the sleeve and an additional component disposed on the sleeve.

* * * * *